3,415,895
PERFLUORODICYCLOPENT - 1,1' - ENYL
AND METHOD FOR MANUFACTURE
THEREOF

Maurice Stacey, Robert Stephens, and John Colin Tatlow, Edgbaston, Birmingham, England, assignors to Hooker Chemical Corporation, Niagara Falls, N.Y., a corporation of New York
No Drawing. Filed May 5, 1966, Ser. No. 547,756
6 Claims. (Cl. 260—648)

ABSTRACT OF THE DISCLOSURE

Perfluorodicyclopent-1,1'enyl is made by the reaction of 1-bromoheptafluorocyclopentene with copper bronze at an elevated temperature, such as one within the range of about 200 degrees to about 300 degrees centigrade.

---

This invention relates to perfluorodicyclopent-1,1'enyl and to a process of preparaiton thereof. The present invention relates to a perfluorodicylcopentenyl compound, preferably made by the reaction of a perfluorinated bromocycloolefin with copper bronze.

The compound of this invention is perfluorodicyclopent-1,1'enyl,

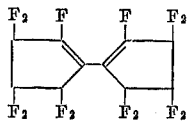

It is prepared by the reaction of 1-bromoheptafluorocyclopentene with copper bronze at elevated temperatures. The main reaction occurring is illustrated by the following equation which is not intended to be limiting:

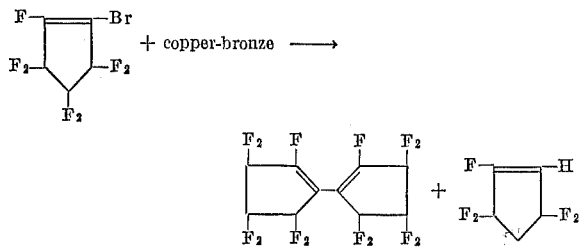

The 1-bromoheptafluorocyclopentene was prepared by the addition of bromine to 1H-nonafluorocyclopentene under ultraviolet light irradiation followed by dehydrobromination of the crude dibromide with aqueous alkali.

The copper bronze is mainly a copper base alloy which is a commercial pulverized form of copper, such as is used in the Ullmann reaction, was prepared by a hydrogen reduction procedure and was purchased from British Drug Houses, Limited, in London.

The process is accomplished at elevated temperatures in the range of from about 200 degrees centigrade to about 300 degrees centigrade with a preferred temperature range being from about 225 degrees centigrade to about 250 degrees centigrade.

With respect to molar ratios of reactants, these will depend on the reaction conditions and the amount of product desired. Generally, an excess of copper bronze is used. Normally about 5 moles of copper bronze per one mole of bromocycloolefin is used. Greater and lesser amounts can be employed such as 6 to 10 moles of copper bronze to 0.5 to 3 moles of bromocycloolefin but the yield and purity of product obtained may be adversely affected under some such conditions. It is, of course, appreciated that other molar ratios of reactants can be employed.

However, in such instances, the reaction mechanism may be adversely affected, thereby resulting in the production of a mixture of products.

The desired compound can be isolated from the reaction mixture by a number of known methods, e.g., distillation, fractional crystallization. However, in the practice of the present invention, the product was separated by gas chromatography.

An alternative method for preparing the novel compound of the present invention involves the reaction of 1-bromoheptafluorocyclopentene with bromobenzene and copper bronze at temperatures from about 200 degrees centigrade to 300 degrees centigrade. The reaction details are disclosed in a copending application.

The compound of the present invention is useful as an intermediate for the preparation of polymers and fire retardant additives. As a fire retardant additive the compound of this invention can be incorporated into polymeric materials, i.e., polyesters, polycarbonates, in an amount of from about 2 to about 50 percent by weight of the polymeric composition and desirably from about 10 to about 40 percent by weight of the polymeric composition, admixed with the polymeric composition. Improved fire retardance can also be provided by incorporating into the polymer metallic compounds wherein the metal is antimony, arsenic or bismuth in amounts of from about one to about 30 percent by weight of said polymer composition. For the preparation of polymers the compound of this invention can be reacted with an unsaturated carboxylic compound, like maleic anhydride, in a Diels-Alder reaction, followed by subsequent reaction with a glycol and more unsaturated carboxylic compound. The resulting polyester can be copolymerized with vinyl monomers such as styrene to yield products which are useful as laminating agents and castings.

The following examples are presented to further illustrate the invention but are not intended to limit its scope. Unless otherwise specified, all temperatures are in degrees centigrade and all parts are by weight.

Example 1.—Reaction of 1-bromoheptafluorocyclopentene in the presence of copper bronze 1-bromoheptafluorocyclopentene, 1.6 grams, and copper bronze, 1.8 grams, were heated in a sealed hard glass tube at 230 degrees centigrade for 4.8 hours. The organic product, 0.95 grams, was vacuum distilled from the spent copper bronze. Separation of the product, 0.9 grams, by preparative gas chromatography yielded (1) 1H-heptafluorocyclopentene, 0.06 gram, 5.3 percent; (2) perfluorodicyclopent-1,1'-enyl, 0.50 gram, 44.3 percent; melting point 22–23 degrees centigrade; boiling point 131 degrees centigrade.

Analysis.—Calculated for $C_{10}F_{14}$: C, 31.1 percent; H, 0.0 percent. Found: C, 31.4 percent; H, 0.3 percent.

Gas chromatographic recovery was 62 percent and over-all recovery 49.6 percent.

Example 2.—Reaction of 1-bromoheptafluorocyclopentene with bromobenzene in the presence of copper bronze 1-bromoheptafluorocyclopentene, 2.2 grams, bromobenzene, 2.2 grams, and a commercial form of pulverized copper bronze, 4 grams, were sealed in a hard glass tube and heated in a Carius furnace at 245–250 degrees centigrade for 63 hours. The volatile products, 2.6 grams, were distilled in vacuo from the copper bronze and separated by preparative gas chromatography to yield (1) 1H-heptafluorocyclopentene, 0.05 gram; (2) perfluorodicyclopent-1,1'-enyl, 0.2 gram; (3) benzene, 0.1 gram; (4) bromobenzene, 0.05 gram; (5) 1-phenylheptafluorocyclopentene, 1.33 grams, with an infrared spectrum identical to that of the product of the reaction of octafluorocyclopentene with phenyl lithium, and (6) diphenyl, 0.13 gram. By infrared spectroscopy, the peaks for (6) showed no trace of 1-bromoheptafluorocyclopentene, and the spectrum was correct for perfluorodicyclopent-1,1'-enyl.

The infrared spectrum of perfluorodicylopent-1,1'-enyl showed strong absorption at 6.24 microns and very strong absortion at 8.5, 9.5 and 10.3 microns consistent with a C=C grouping, a C—F and a

grouping, and a pattern of absorption very similar to perfluorodicyclohex-1,1'-enyl. The ultraviolet spectrum in ethanol showed a maximum absorption at 2600 degrees ($\epsilon_{max}$. 18300). Mass spectroscopy showed a total mass peak of 386 (M, 386) and a fragmentation pattern consistent with two linked cyclopentene rings. The F nuclear magnetic resonance spectrum was consistent with a monosubstituted heptafluorocyclopentene.

Perfluorodicyclopent-1,1'-enyl, 0.11 gram, was shaken with a solution of potassium permanganate, 0.2 gram, in acetone, 20 milliliters, for 30 minutes. Water, 20 milliliters, was added and the mixture shaken for a further 30 minutes. The suspension was neutralized (NaHCO$_3$) and the acetone was distilled off under reduced pressure. Manganese dioxide was destroyed by bubbling sulfur dioxide through the solution. After acidifying (H$_2$SO$_4$ d. 1.84), the solution was extracted with ether for 20 hours. The ethereal solution was dried with MgSO$_4$ and the ether was evaporated. The resulting solid was dissolved in the minimum volume of water, the pH was adjusted to 4 and a saturated aqueous solution of S-benzyl thiuronium chloride was added. The precipitate was recrystallized from water to yield bis-(S - benzyl thiuronium) - hexafluoroglutarate, 0.099 gram, melting point 188–189 degrees centigrade. The product had the correct infrared spectrum.

*Analysis.*—Calculated for C$_{21}$H$_{22}$F$_6$N$_4$O$_4$S$_2$: C, 44.0 percent; H, 3.9 percent. Found: C, 41.1 percent; H, 4.0 percent.

While there have been described various embodiments of the invention, the compositions and methods described are not intended to be understood as limiting the scope of the invention as it is realized that changes therein are possible, and it is further intended that each element recited in any of the following claims is intended to be understood as referring to all equivalent elements for accomplishing substantially the same results in substantially the same or equivalent manner, it being intended to cover the invention broadly in whatever form its principles may be utilized.

What is claimed is:

1. A process for the preparation of perfluorodicyclopent-1,1'-enyl which comprises reacting 1 - bromoheptafluorocyclopentene with copper bronze at a temperature in the range of from about 200° C. to about 300° C.

2. A process in accordance with claim 1 wherein about 5 moles of copper bronze per mole of 1-bromoheptafluorocyclopentene are employed.

3. A process according to claim 1 wherein the molar ratio of copper bronze to bromocycloolefin is between 2 and 20.

4. A process according to claim 3 wherein the reaction is effected in a sealed container.

5. A process according to claim 4 wherein the reaction is conducted at a temperature of about 230 degrees centigrade for a period of about five hours.

6. A process according to claim 5 wherein the reaction product is vacuum distilled from the copper bronze.

References Cited

UNITED STATES PATENTS 2,668,182   2/1954   Miller.

OTHER REFERENCES

Hudlicky, "Chemical of Organic Fluorine Compounds", pp. 263–267 (1962).

Domnin et al., "Chemical Abstract" vol. 56, col. 1145 3d (1956).

LEON ZITVER, *Primary Examiner.*

M. JACOB, *Assistant Examiner.*

U.S. Cl. X.R.

260—45.7, 45.75

PO-1050
(5/69)

UNITED STATES PATENT OFFICE
CERTIFICATE OF CORRECTION

Patent No. 3,415,895      Dated December 10, 1968

Inventor(s) Maurice Stacey, Robert Stephens and John Colin Tatlow

It is certified that error appears in the above-identified patent and that said Letters Patent are hereby corrected as shown below:

Column 1, line 45, the right hand formula should be corrected to read as

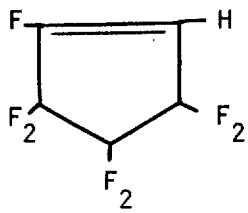

SIGNED AND
SEALED
FEB 24 1970

(SEAL)
Attest:

Edward M. Fletcher, Jr.
Attesting Officer

WILLIAM E. SCHUYLER, JR.
Commissioner of Patents